March 10, 1942.  H. H. CURRY  2,275,508

MULTISPEED REVERSING COUPLING

Filed Oct. 16, 1940

WITNESSES:
C. J. Weller.
Wm. J. Ruano

INVENTOR
Herman H. Curry.
BY
Paul E. Friedemann
ATTORNEY

Patented Mar. 10, 1942

2,275,508

UNITED STATES PATENT OFFICE 2,275,508

MULTISPEED REVERSING COUPLING

Herman H. Curry, Montgomery County, Md., assignor to Westinghouse Electric & Manufacturing Company, East Pittsburgh, Pa., a corporation of Pennsylvania Application October 16, 1940, Serial No. 361,343

11 Claims. (Cl. 172—239)

My invention relates to a dynamo-electric, multi-speed reversible drive of general application but which is particularly adapted for ship propulsion drives.

An object of my invention is to provide a marine propulsion drive having a combination of Diesel engine, electric coupling, and induction propulsion motor to secure, by the principle of cumulative or differential cascade operation, two or more speeds ahead and one or more speeds astern while operating the Diesel engine always in the same direction of rotation.

Another object of my invention is to provide a speed control system for a marine propulsion drive which is simple, easy to install and operate, and inexpensive and yet which will be highly satisfactory for ordinary requirements in ship propulsion.

Other objects and advantages will become more apparent from a study of the following specification when considered in conjunction with the accompanying drawing, in which.

In accordance with my invention, I have provided a relatively simple means of reversing the propeller without reversing the Diesel engine and at the same time, I have provided a satisfactory degree of speed control.

Figure 1:
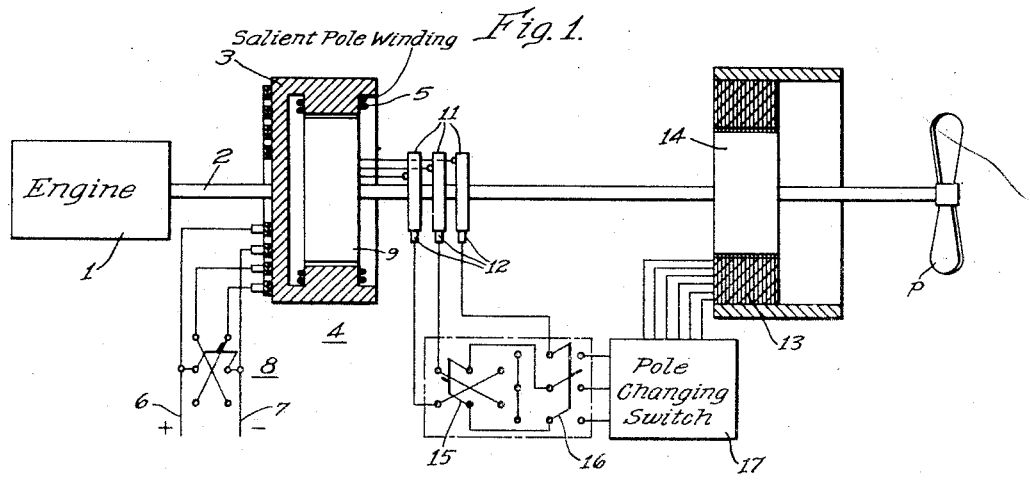
Figure 1 is a schematic showing of a marine propulsion system embodying the principles of my invention.
Figure 2:
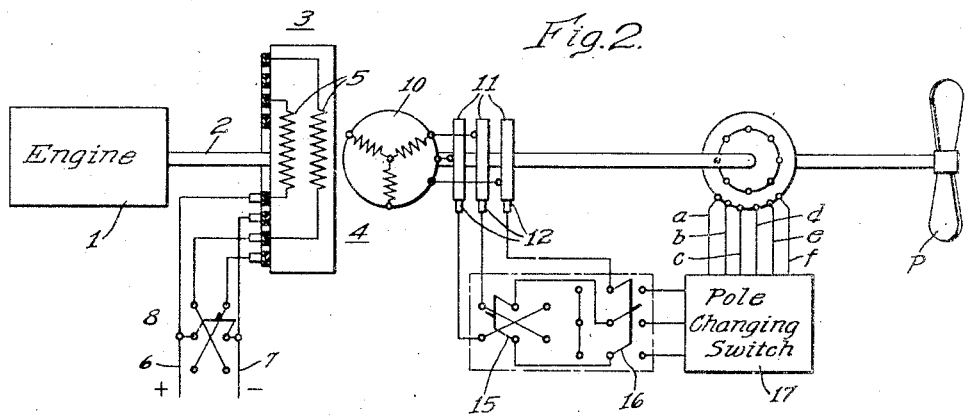
Fig. 2 is a schematic showing of the electrical control system embodied in Fig. 1.

Referring more particularly to Figs. 1 and 2, numeral 1 denotes a prime mover such as a Diesel engine which drives a shaft 2, which shaft has mechanically coupled thereto a driving element 3 of the electric or electromagnetic coupling 4. Salient poles are provided on the driving element 3 having windings 5 which are energized by a direct current source of potential, indicated by terminals 6 and 7, through a reversing switch 8. By suitable operation of the reversing switch, the salient pole winding may be connected for two selective pole numbers so as to secure speed control for the drive. The driven element 9 of the electromagnetic coupling has mounted thereon an alternating current, phase wound winding 10 having terminals which are connected to slip rings 11.

It will be understood that while the driving element is shown as being the salient pole winding, it may be, instead, the phase wound winding, in which case, the driven element would be the salient pole member, if so desired. Brushes 12 serve as terminals for alternating current energy supplied by the phase winding 10. This alternating current energy is supplied to the stator winding 13 of an induction motor which induction motor has a squirrel cage rotor 14. Mechanically coupled to rotor 14 is a propeller P. Interposed between brushes 12 and the stator winding 13 is the reversing switch 15, switch 16, and a pole changing switch 17.

The operation of my device is as follows:

(1) With the Diesel engine operating at from idling to full speed and the switch 16 thrown to the left to short circuit the winding on the phase wound member of the coupling, the engine drives the propeller direct through the coupling.

(2) With the Diesel engine operating and the switch 16 thrown to the right the coupling will be in tandem or cascade connection with the propelling motor and the propeller will operate in the "ahead" direction at reduced speed. There are two speeds possible, depending on whether the pole changing switch 17 is thrown to one or the other of its positions.

(3) With the Diesel engine operating and the reverse switch 15 thrown to reverse and the switch 16 thrown to the right, the propeller will operate in the "astern" direction. There are two possible speeds "astern" depending on the position of pole changing switch 17, but in general only the slower of these two speeds will be used for "astern" operation.

It should be understood that the number of poles can be changed on the salient pole winding on the electric coupling by operation of the pole changing switch 8 and additional speeds "ahead" and "astern" may be provided, if desired.

As an example for assistance in understanding my invention, if the full speed on the Diesel engine is 750 R. P. M. and the coupling has 12 poles, and if the propelling motor is arranged for 16 or 32 poles the possible speeds corresponding to 100% engine speed will be:

Ahead: 750—321.4—204 R. P. M.
Astern: 450 R. P. M. for 32 poles.

A sample calculation to arrive at the above speed is as follows:

$12 (750-x) = 16x$
$28x = 9000$
$x = 321.4$ R. P. M. (neglecting slip)

There is a possible speed of 2250 R. P. M. "astern" using the 16 pole winding on the motor but this is excessive and would not be used.

While a pole changing switch 8 is provided for selectively securing two different pole numbers such as a speed ratio of two-to-one on the salient pole winding 5, it will be understood that such switching need not be included and the salient pole winding may be wound permanently for a definite pole number if additional speeds are not required.

Figure 3A:
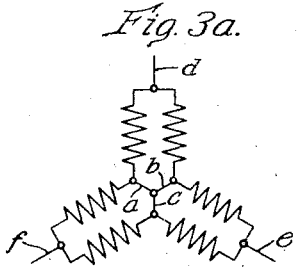
Figs. 3a and 3b are schematic showings of the stator winding of the induction motor for two different pole numbers giving a one to two speed ratio in consequence of operation of the pole changing switch.
Figure 3B:
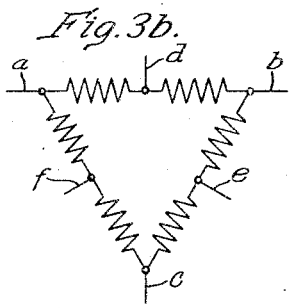

Referring to switch 17 and stator 13 a two-to-one speed ratio may be secured so that placing the pole changing switch 17 for one connection, a parallel rotor connection such as shown in Fig. 3a is secured, whereas, by placing switch 17 in another position, the series delta condition, such as shown in Fig. 3b is secured, which has a pole number twice as great as the pole number represented by the connection shown in Fig. 3a. Letters a to f, inclusive, in Figs. 3a and 3b designate identical terminals. Of course, other schemes of pole changing may be used for obtaining different pole numbers and different speed ratios, all of which are known in the art.

In many applications, the single speed winding on the induction motor stator will be sufficient. For example, for 32 poles, speeds of 204 and 750 ahead and 450 reverse are obtainable which are sufficient for a variety of applications.

While a single, two-speed winding is shown on the induction motor stator, it will be apparent that two separate windings may be used instead. For example, instead of securing a two-to-one speed ratio, ratios such as 8-18 or 12-28 could be obtained which would give about 30% propeller speed at full engine speed or 10% at 30% engine speed. For instance an 8 pole clutch with an 18 pole motor would be suitable for "astern" operation at 80% speed (neglecting slip). For normal "ahead" operation the clutch would be shorted. With a two pole motor winding and the 8 pole clutch, 80% "ahead" speed with 100% engine speed (neglecting slip) would be used for towing or with reversed phase rotation a speed ratio of 133⅓% will be available for cruising at low ship speed.

By a suitable choice of poles, the engine may operate at a low R. P. M. but high M. E. P. at cruising speed. With the driven member rotating at higher than engine speed, the engine may operate at normal full speed and normal full M. E. P. at full speed with vessel running free, or the engine may operate at normal full speed and M. E. P. when towing at a lower propeller speed of, say, 80% of normal full speed of propeller when running free.

I am, of course, aware that others, particularly after having had the benefit of the teachings of my invention, may devise other devices embodying my invention, and I, therefore, do not wish to be limited to the specific showings made in the drawing and the descriptive disclosure hereinbefore made, but wish to be limited only by the scope of the appended claims and such prior art that may be pertinent.

I claim as my invention:

1. A multi-speed dynamo-electric drive comprising, in combination, an electromagnetic coupling having a salient pole, direct current energized, driving member and a phase wound driven member, and an induction motor having a multi-speed stator winding which is electrically connected to said phase wound driven member and having a rotor which is mechanically coupled to said phase wound driven member.

2. A multi-speed dynamo-electric drive comprising, in combination, an electromagnetic coupling having a salient pole, direct current energized driving member and a phase wound driven member, an induction motor having a multi-speed stator winding which is electrically connected to said phase wound driven member and having a rotor which is mechanically coupled to said phase wound driven member, and switching means for selectively short circuiting said phase wound driven member for effecting direct drive of the electromagnetic coupling or for relieving said short circuit and allowing the phase winding of said driven member to act as an alternating current generator for furnishing power to said multi-speed stator winding for selective speed operation.

3. A multi-speed dynamo-electric drive comprising, in combination, an electromagnetic coupling having a salient pole, direct current energized driving member and a phase wound driven member, an induction motor having a multi-speed stator winding which is electrically connected to said phase wound driven member and having a rotor which is mechanically coupled to said phase wound driven member, a load also mechanically coupled to said rotor and driven member, switching means for selectively short circuiting said phase wound driven member for effecting direct drive of the electromagnetic coupling or for relieving said short circuit and allowing the phase winding of said driven member to act as an alternating current generator for furnishing power to said multi-speed stator winding for selective speed operation, and a reversing switch for changing the phase sequence of the phase winding of said driven member so as to selectively operate said induction motor either in the same direction or opposite direction of rotation with respect to the driving member.

4. A multi-speed dynamo-electric drive comprising, in combination, an electromagnetic coupling having a salient pole, direct current energized driving member and a phase wound driven member, an induction motor having a multi-speed stator winding which is electrically connected to said phase wound driven member and having a rotor which is mechanically coupled to said phase wound driven member, and selective switching means for selectively changing the number of poles of said salient pole driving member.

5. A multi-speed dynamo-electric drive comprising, in combination, an electromagnetic coupling having rotatable driving and driven members, one of said members having mounted thereon a salient pole, direct current energized and the other of said members having mounted thereon an alternating current phase winding, an induction motor having a squirrel cage rotor mechanically coupled to the driven element of said coupling and a two speed stator winding which is electrically connected to said phase winding, switching means for selectively short circuiting said phase winding, and switching means for selectively connecting said stator winding for two different numbers of poles, said stator winding being energized solely when said short circuit is removed at which time said phase winding acts as a generator for furnishing power to said stator winding.

6. A multi-speed dynamo-electric drive comprising, in combination, an electromagnetic coupling having rotatable driving and driven members, one of said members having mounted thereon a salient pole, direct current energized and the other of said members having mounted thereon an alternating current phase winding, an induction motor having a squirrel cage rotor mechanically coupled to the driven element of said coupling and a two speed stator winding which is electrically connected to said phase winding, switching means for selectively short circuiting said phase winding, and switching means for selectively connecting said stator winding for two different numbers of poles, and for selectively changing the phase sequence of said phase winding so as to secure rotation of said rotor either in the same direction or in an opposite direction of rotation with respect to the driving member of said electromagnetic coupling, said stator winding being energized solely when said short circuit is removed at which time said phase winding acts as a generator for furnishing power to said stator winding.

7. A multi-speed dynamo-electric drive comprising, in combination, an electromagnetic coupling having rotatable driving and driven members, one of said members having mounted thereon a salient pole, direct current energized winding and the other of said members having mounted thereon an alternating current phase winding, an induction motor having a squirrel cage rotor mechanically coupled to the driven element of said coupling and a two speed stator winding which is electrically connected to said phase winding, switching means for selectively short circuiting said phase winding, and switching means for selectively connecting said stator winding for two different numbers of poles, and for selectively changing the phase sequence of said phase winding so as to secure rotation of said rotor either in the same direction or in an opposite direction of rotation with respect to the driving member of said electromagnetic coupling, said stator winding being energized solely when said short circuit is removed at which time said phase winding acts as a generator for furnishing power to said stator winding, and for selectively changing the phase sequence of said phase winding so as to secure rotation of said rotor either in the same direction or in an opposite direction of rotation with respect to the driving member of said electromagnetic coupling.

8. A multi-speed dynamo-electric drive comprising, in combination, an electromagnetic coupling having rotatable driving and driven members, one of said members having mounted thereon a salient pole, direct current energized winding and the other of said members having mounted thereon an alternating current phase winding, an induction motor having a squirrel cage rotor mechanically coupled to the driven element of said coupling and a two speed stator winding which is electrically connected to said phase winding, switching means for selectively short circuiting said phase winding, and switching means for selectively connecting said stator winding for securing direct drive through said electromagnetic coupling, for two different numbers of poles, said stator winding being energized solely when said short circuit is removed at which time said phase winding acts as a generator for furnishing power to said stator winding, and switching means operable only upon removal of said short circuit for changing the phase sequence of said phase winding so as to secure two speed operation of said rotor either in the same direction or in an opposite direction of rotation with respect to the driving element of the electromagnetic coupling.

9. A dynamo-electric drive comprising, in combination, an electromagnetic coupling having a salient pole, direct current energized driving member and a phase wound driven member, an induction motor having a stator winding which is electrically connected to said phase wound driven member and having a rotor which is mechanically coupled to said phase wound driven member, a load also mechanically coupled to said rotor and driven member, and switching means for selectively short circuiting said phase wound driven member for effecting direct drive of the electromagnetic coupling or for relieving said short circuit and allowing the phase winding of said driven member to act as an alternating current generator for furnishing power to said stator winding for selective speed operation.

10. A dynamo-electric drive comprising, in combination, an electromagnetic coupling having a salient pole, direct current energized driving member and a phase wound driven member, an induction motor having a stator winding which is electrically connected to said phase wound driven member and having a rotor which is mechanically coupled to said phase wound driven member, a load also mechanically coupled to said rotor and driven member, switching means for selectively short circuiting said phase wound driven member for effecting direct drive of the electromagnetic coupling or for relieving said short circuit and allowing the phase winding of said driven member to act as an alternating current for furnishing power to said stator winding for selective speed operation, and a reversing switch for changing the phase sequence of the phase winding of said driven member so as to selectively operate said induction motor either in the same direction or opposite direction of rotation with respect to the driving member.

11. A dynamo-electric drive comprising, in combination, an electromagnetic coupling having a salient pole, direct current energized driving member and a phase wound driven member, an induction motor having a stator winding which is electrically connected to said phase wound driven member and having a rotor which is mechanically coupled to said phase wound driven member, a load also mechanically coupled to said rotor and driven member, and switching means for selectively short circuiting said phase wound driven member for effecting direct drive of the electromagnetic coupling or for relieving said short circuit and allowing the phase winding of said driven member to act as an alternating current generator for furnishing power to said stator winding for selective speed operation, and selective switching means for selectively changing the number of poles of said salient pole driving member.

HERMAN H. CURRY.